United States Patent [19]

Crist, Jr.

[11] 4,162,783

[45] Jul. 31, 1979

[54] ELECTRIC FENCE CABLE ASSEMBLY

[76] Inventor: V. William Crist, Jr., Box C, Wessington Springs, S. Dak. 57382

[21] Appl. No.: 892,233

[22] Filed: Mar. 31, 1978

[51] Int. Cl.[2] ................................................ A01K 3/00

[52] U.S. Cl. ....................................................... 256/10

[58] Field of Search .......................... 256/10; 361/232; 200/52 R, 61.58 R, 275, 86 R, 61.57, DIG. 1; 55/150, 151, 152, 149; 339/97 C, 98, 276 R, 276 T

[56] References Cited

U.S. PATENT DOCUMENTS

| | | | |
|---|---|---|---|
| 2,790,873 | 4/1957 | Fleming | 200/86 R |
| 3,025,377 | 3/1962 | Murray | 200/52 R X |
| 3,294,893 | 12/1966 | Shaffer | 361/232 X |
| 3,366,854 | 1/1968 | Robinson | 361/232 |

FOREIGN PATENT DOCUMENTS

| | | | |
|---|---|---|---|
| 762686 | 12/1956 | United Kingdom | 256/10 |

*Primary Examiner*—Werner H. Schroeder
*Attorney, Agent, or Firm*—Henderson & Sturm

[57] ABSTRACT

An improvement in electrified cable assemblies for use with electrically charged fences is disclosed. The improvement provides for a dual conductor insulated cable having a plurality of longitudinally spaced contacts mounted thereon with alternate contacts being connected to one of the conductors and the remaining contacts being connected to the remaining conductor, wherein one conductor is electrically connected to a fence charger and the remaining conductor is electrically connected to ground.

5 Claims, 4 Drawing Figures

ELECTRIC FENCE CABLE ASSEMBLY

BACKGROUND OF THE INVENTION

Electrically charged fences are designed to impart an electrical shock to an animal by establishing an electrical circuit between ground and a source of electrical potential through an animal. These systems commonly utilize a single wire, a double wire or two separate wires.

The single wire system includes an uninsulated wire connected to a fence charger wherein an animal upon touching the wire causes the current to flow from the wire through the animal to the ground. If the ground or soil condition is frozen or dry there is a sharp increase in the electrical resistance of the current path through ground so as to reduce the current flow and shock sometimes to such a low value that the electrically charged fence becomes ineffective.

The double wire system has longitudinally spaced contact plates with alternate plates connected to one wire and the other plates connected to the other wire. The one wire is connected to the fence charger and the other wire is connected to ground. During normal, dry or cold weather conditions when adjacent contacts are bridged by an animal the current shocks the animal. However, during some particular weather conditions there is a leakage of the shocking current on the insulated sections between adjacent contacts, thus making the cable ineffective for livestock control.

The two wire system overcomes the problem of dry or frozen conditions by utilizing a ground wire above or below the charged wire; however, this system is not always effective where controlled feeding of cattle is desired.

SUMMARY OF THE INVENTION

The electrified cable assembly of this invention relates to an improvement of the invention disclosed in my U.S. Pat. No. 3,504,892, a double wire system, and over the single and two wire systems. The cable comprises a pair of conductors encased in a weatherproof insulated sheathing. A plurality of contacts are longitudinally spaced along the cable and alternate contacts are electrically connected to one of the conductors while the remaining contacts are connected to the remaining conductor.

It is an object of this invention to provide an electrified cable assembly which is effective under all weather conditions and which permits the shocking current to flow between adjacent contacts or between one of the alternate contacts and ground, depending on the weather conditions.

Another object of this invention is to provide a dual conductor insulated cable having contacts operatively connected thereto for transmitting a shock when a pair of adjacent contacts touch the skin of an animal.

Yet another object is the provision of an electrified cable assembly which is extremely functional, simple in construction and economical to manufacture.

Yet still another object of this invention is the provision of an electrified cable assembly having electrical contact units that will not snag hay or the like, thereby avoiding sagging of the cable or short circuiting the cable circuit.

BRIEF DESCRIPTION OF THE DRAWINGS

These objects and other features and advantages of this invention will become more readily apparent when taken upon reference to the following detailed description, and especially when taken in conjunction with the appended drawings, wherein.

DESCRIPTION OF THE PREFERRED EMBODIMENT

Figure 1:
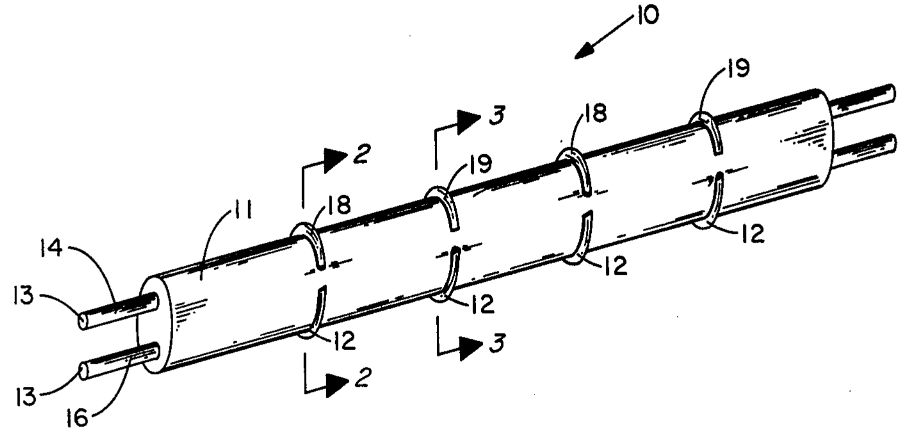
FIG. 1 is a perspective view of the electrified cable assembly of this invention.

Referring now to the drawings, and in particular to FIG. 1, the electrified cable assembly is indicated generally by the numeral 10. More particularly, the assembly includes a cable 11, and a plurality of contact units 12. The cable 11 is formed by a pair of wire conductors 13, hereinafter called the charged wire 14 and the ground wire 16. A weatherproof insulated sheathing 17 is disposed about both conductors 13 to protect and insulate the conductors 13 from each other and from the environment.

A plurality of contact units 12 are longitudinally spaced along the cable 11 with alternate contacts 18 being electrically connected to the charged wire 14 and the other contacts 19 being electrically connected to the ground wire 16.

Figure 2:
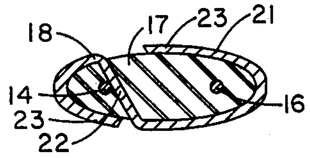
FIG. 2 is a sectional view taken along the lines 2—2.
Figure 3:
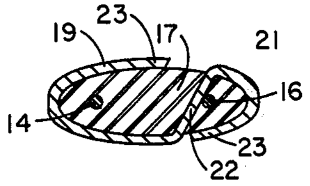
FIG. 3 is a sectional view taken along the lines 3—3.

The contact units 12 (FIGS. 2 and 3) are identical, and therefore only one will be described, with like numbers representing like parts. As each contact unit 12 is actually formed during assembly, the assembly operation will be described to identify each unit.

In assembly of the cable 11 and contact units 18, an elongated piece of wire 21 (FIG. 2) is pushed through the sheathing 17, such that the center portion 22 of the wire 21 is tangent to the charged wire 14 on the side thereof which is proximate the ground wire 16. The end portions 23 of the wire 21 are then bent in a clockwise direction about the exterior of the sheathing 17 such that an S-shaped member is resultant. It will thus be noted that the wire 21 substantially girds the cable 11 and the body thereof forms an exposed contact unit 18 which is electrically connected to the charged wire 14.

The remaining contact 19 (FIG. 3) is formed in substantially the same manner as described above, with the exception that the center portion 22 of the wire 21 tangentially touches the outer surface of the ground wire 16. Also, the wire 21 is bent counter clockwise about the cable 11, in contrast to the above.

Figure 4:
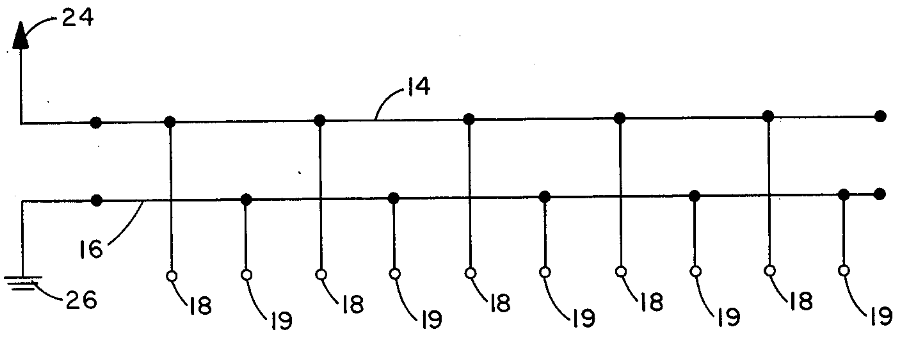
FIG. 4 is a schematic wiring diagram of the electrified cable assembly.

FIG. 4 depicts a schematic wiring diagram of the circuitry wherein the charged wire 14 is electrically connected to a fence charger 24 (not shown) which provides an electric charge. The charger 24 is usually electrically connected to a ground 26 such as the earth. The ground wire 16 is also electrically connected to ground 26.

In operation, with the fence charger 24 providing an electrical charge, any animal touching any two oppositely biased contacts 18 and 19 will receive a repelling charge because an electrical circuit has been completed. It will further be noted that if only one of the contacts 18 connected to the charged wire 14 is touched and the animal is properly grounded, a repelling charge will be received. It should also be noted that by having the wire 21 bent as described, the contact units 12 have no exposed protrusions capable of snagging hay or the like, thereby avoiding both weight accumulation upon the cable and the risk of damp hay short-circuiting the cable assembly.

It is to be remembered that only a preferred embodiment has been disclosed above, and that many variations will occur to those skilled in the art. Such variations are not to be considered as without the scope of the appended Claims.

I claim:

1. An improvement in an electrified cable assembly for use with electrically charged fences having a fence charger for providing an electric charge, the improvement comprising:

a first conductor electrically connected to the fence charger;

a second conductor electrically connected to ground;

unitary insulating means disposed about said first and second conductors such that said conductors are electrically insulated from each other and the environment;

a first electrically conductive contact unit disposed proximate said insulating means and in electrical contact with said first conductor; and a second electrically conductive contact unit disposed proximate said insulating means distant said first conductor and in electrical contact with said second conductor.

2. The improvement as described in claim 1 wherein:

said first electrically conductive contact unit includes a first wire having a first end and a second end; and said second electrically conductive contact unit includes a second wire having a first end and a second end.

3. The improvement as described in claim 2 wherein:

said first wire is disposed through said insulating means such that the first and second ends of said first wire remain exposed; and said second wire is disposed through said insulating means such that the first and second ends of said second wire remains exposed.

4. The improvement as described in claim 3 wherein:

the first and second ends of said first wire are formed substantially circumferentially about said insulating means; and the first and second ends of said second wire are formed substantially circumferentially about said insulating means.

5. The improvement as described in claim 4 wherein:

the first and second ends of said first wire are shaped inwardly to said insulating means; and the first and second ends of said second wire are shaped inwardly to said insulating means.

* * * * *